(12) United States Patent
Samejima et al.

(10) Patent No.: US 7,458,434 B2
(45) Date of Patent: Dec. 2, 2008

(54) LAWN MOWER HAVING AN ENGINE DISPOSED REARWARDLY OF A DRIVER'S SEAT

(75) Inventors: Kazuo Samejima, Kaizuka (JP); Hironori Tsuchihashi, Wakayama (JP); Teruo Shimamura, Duluth, GA (US); Yoshikazu Togoshi, Osaka (JP); Hiroshi Kawabata, Sakai (JP); Takeshi Komorida, Sakai (JP)

(73) Assignee: Kubota Corporation, Osaka (JP)

( * ) Notice: Subject to any disclaimer, the term of this patent is extended or adjusted under 35 U.S.C. 154(b) by 514 days.

(21) Appl. No.: 11/180,296

(22) Filed: Jul. 13, 2005

(65) Prior Publication Data
US 2006/0016632 A1 Jan. 26, 2006

(30) Foreign Application Priority Data
Jul. 23, 2004 (JP) ............................ 2004-216064
Mar. 8, 2005 (JP) ............................ 2005-063849

(51) Int. Cl.
*B60K 11/00* (2006.01)
(52) U.S. Cl. .................... 180/68.1; 180/68.4; 180/69.24
(58) Field of Classification Search ................ 180/68.1, 180/68.2, 68.4, 68.6, 69.24, 69.2, 89.17; 123/41.49, 41.7, 41.48, 41.56; D15/23
See application file for complete search history.

(56) References Cited

U.S. PATENT DOCUMENTS

| | | | | |
|---|---|---|---|---|
| 4,301,668 A | * | 11/1981 | Renz | ............................ 70/422 |
| 4,573,544 A | * | 3/1986 | Hoch et al. | ................. 180/68.1 |
| D298,539 S | * | 11/1988 | Katoh et al. | ................... D15/23 |
| D409,628 S | * | 5/1999 | Shimamura et al. | .......... D15/15 |
| 6,068,675 A | * | 5/2000 | Tsuda et al. | ................ 55/385.3 |
| 6,105,349 A | * | 8/2000 | Busboom et al. | ............. 56/14.7 |
| 6,202,777 B1 | | 3/2001 | Surridge | |
| 6,655,486 B2 | * | 12/2003 | Oshikawa et al. | ........... 180/68.1 |
| 6,823,955 B2 | * | 11/2004 | Hall et al. | ................... 180/68.1 |
| 6,854,252 B2 | * | 2/2005 | Foster | ........................ 56/320.1 |
| 7,204,329 B2 | * | 4/2007 | Pfohl et al. | ................. 180/68.3 |
| 2004/0045754 A1 | * | 3/2004 | Bland | ........................ 180/68.1 |

FOREIGN PATENT DOCUMENTS

| | | |
|---|---|---|
| JP | 57-189924 | 12/1982 |
| JP | 07-327463 | 12/1995 |
| JP | 09-068043 | 3/1997 |
| JP | 1-96335 | 6/1998 |
| JP | 10-339169 | 12/1998 |
| JP | 2003-154857 A | 5/2003 |
| JP | 2003-326985 | 11/2003 |

\* cited by examiner

*Primary Examiner*—Christopher Ellis
*Assistant Examiner*—John D Walters
(74) *Attorney, Agent, or Firm*—The Webb Law Firm

(57) ABSTRACT

A lawn mower comprises: a plurality of wheels; a vehicle body supported by the wheels; a mower unit supported by said vehicle body; a driver's seat supported by said vehicle body; an engine supported by said vehicle body rearwardly of said driver's seat; a radiator disposed between said engine and said driver's seat; a hood for covering said engine; and a dust filtering case disposed at a forward portion of said hood for allowing ambient cooling air to be drawn into said radiator, the dust filtering case surrounding at least a part of the radiator and having a net portion on at least one side thereof, the net portion extending rearwardly beyond a front surface of said radiator.

15 Claims, 18 Drawing Sheets

LAWN MOWER HAVING AN ENGINE DISPOSED REARWARDLY OF A DRIVER'S SEAT

BACKGROUND OF THE INVENTION

The publication of Japanese patent application No. 2003-154857 discloses a lawn having a box-shaped dust filtering netting disposed forwardly of a radiator to guide clean ambient air having passed through the dust netting to the radiator.

Such a lawn mower has an engine located as forward as possible in order to reduce an overall length of the vehicle body. This arrangement tends to reduce the spacing between the driver's seat and radiator. It is difficult to secure a large intake area for the box-shaped dust netting disposed between the driver's seat and radiator. For this reason, cooling air passes through the dust netting at high velocity. In a working environment abounding with floating dust, such dust is drawn through, and adheres to, the dust netting, thereby clogging the netting at an early stage. Thus, there is room for improvement.

SUMMARY OF THE INVENTION

A primary object of this invention is to provide a lawn mower that solves the above problem.

The above object is fulfilled, according to this invention, by a lawn mower comprising a plurality of wheels; a vehicle body supported by the wheels; a mower unit supported by said vehicle body; a driver's seat supported by said vehicle body; an engine supported by said vehicle body rearwardly of said driver's seat; a radiator disposed between said engine and said driver's seat; a hood for covering said engine; and a dust filtering case disposed at a forward portion of said hood for allowing ambient cooling air to be drawn into said radiator, the dust filtering case surrounding at least a part of the radiator and having a net portion on at least one side thereof, the net portion extending rearwardly beyond a front surface of said radiator.

With at least lateral portions of the dust netting extending rearward, the entire dust netting has an increased air intake area. Thus, the velocity of cooling air passing through the dust netting may be reduced correspondingly.

Consequently, the lawn mower can engage in an operation without the problem of early clogging or the like.

DETAILED DESCRIPTION OF PREFERRED EMBODIMENTS

Preferred embodiments of this invention will be described hereinafter with reference to the accompanying drawings.

Figure 1:
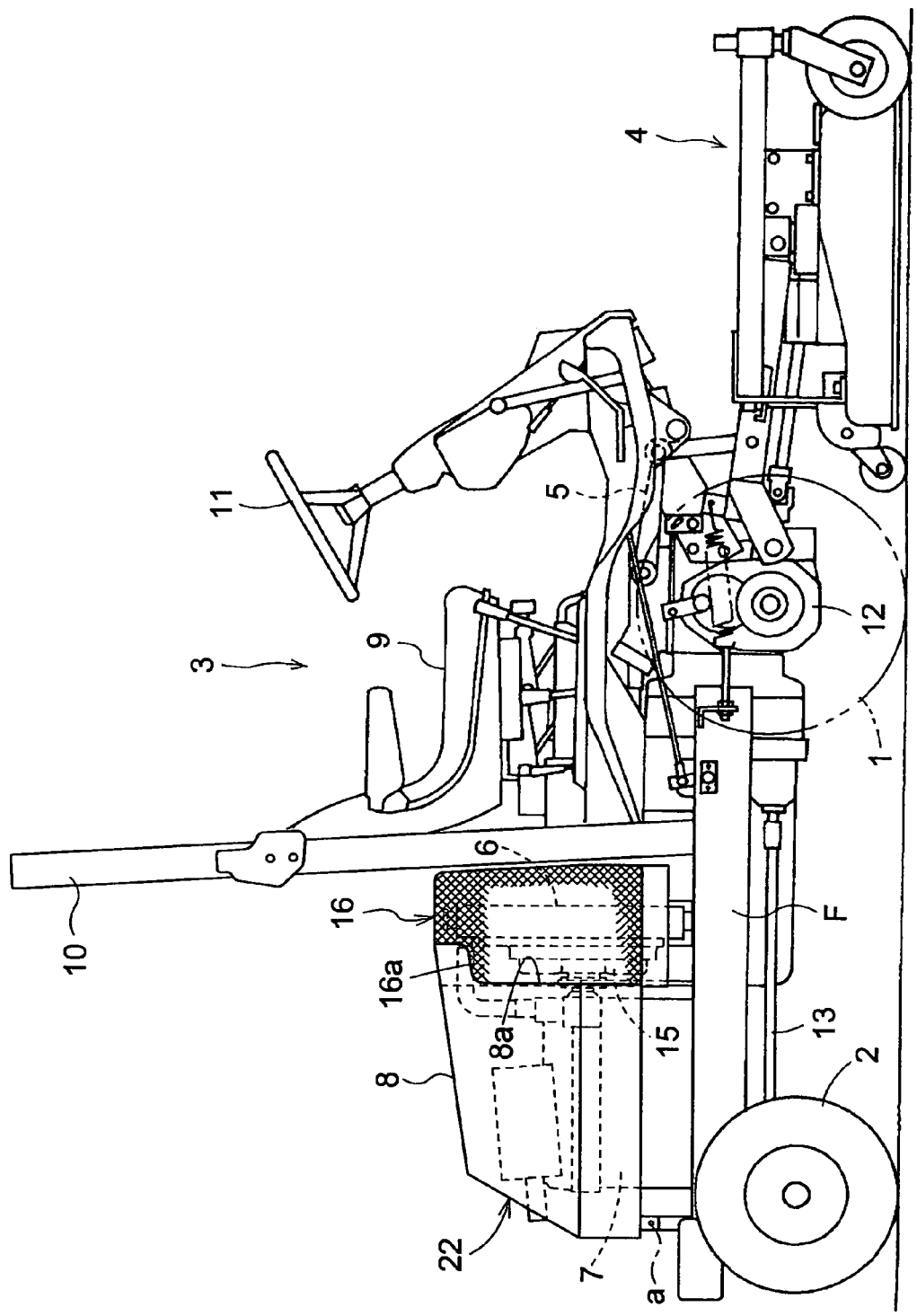
FIG. 1 is a side elevation of a lawn mower according to this invention.
Figure 2:
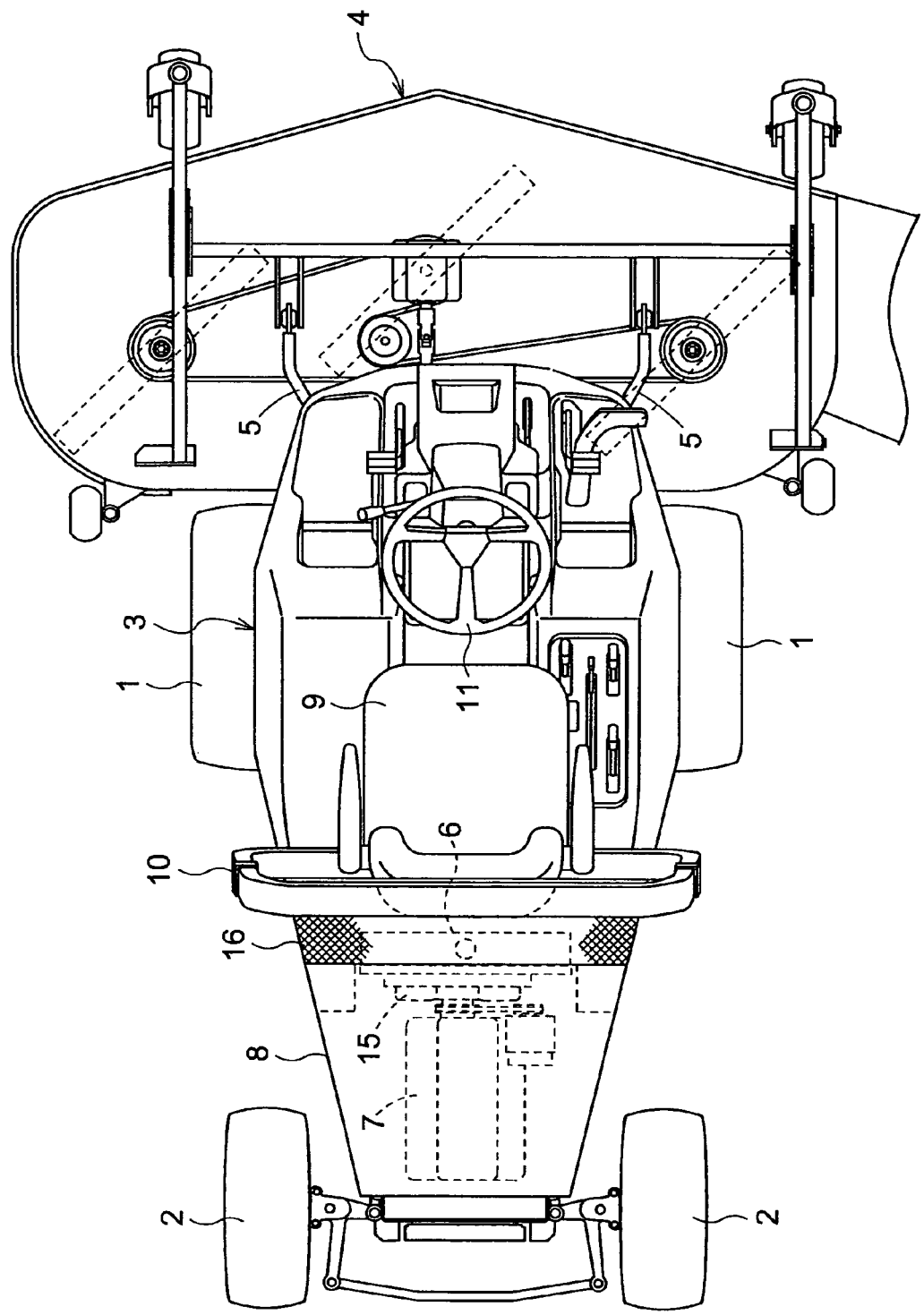
FIG. 2 is a plan view of the lawn mower.

FIG. 1 is a side elevation of a lawn mower according to this invention. FIG. 2 is a plan view of the lawn mower. In this specification, the terms forward, rearward, right, left, lateral and so on refer to the directions with respect to the lawn mower. In the specification, a front surface (or rear surface) of a certain object means, when the meaning of that expression is unclear, a surface, imaginary or otherwise, that can be placed at the front (rear) of and closest to the object when non-essential projecting objects are ignored. Particular features of one embodiment among the plurality of embodiments described in detail below can be combined with other features of the other embodiments, in the absence of confliction. Also in the embodiments below, the expression "dust(s)" means any undesired debris, cut grass, particles or otherwise of any size.

A four-wheel drive type lawn mower includes non-dirigible front wheels 1, dirigible rear wheels 2, and a vehicle body 3 supported by these wheels. The vehicle body 3 includes main frames F disposed in lower portions thereof.

A mower unit 4 having three blades is connected to the front of the vehicle body 3 to be vertically movable through hydraulically driven lift arms 5.

A water-cooled engine 7 is mounted on a rear portion of the vehicle body 3, with a radiator 6 disposed forwardly of the engine 7. The engine 7 is covered by an engine hood 8 vertically swingable to open and close about a rear pivotal axis "a". The engine 7 and engine hood 8 constitute a motor section. The engine hood 8 is shaped to have a width progressively enlarging toward the front as shown in FIG. 2, and a height progressively increasing toward the front. The vehicle body 3 has a driver's seat 9 and an arched rollover protection frame 10 arranged in a substantially middle position longitudinally of the vehicle body 3. Thus, the radiator 6 is located between the engine 7 and driver's seat 9. A steering wheel 11 disposed at the front of the vehicle body 3 for steering the rear wheels 2. Output of the engine 7 is inputted to a transmission case 12 located in a forward portion of the vehicle body 3, and is transmitted in varied speeds to the front wheels 1. Propelling drive branched off in the transmission case 12 is transmitted to the rear wheels 2 through a transmission shaft 13.

This invention is characterized by an engine cooling structure of the lawn mower having the above construction. Some examples of the engine cooling structure will be described hereinafter.

First Embodiment

Figure 3:
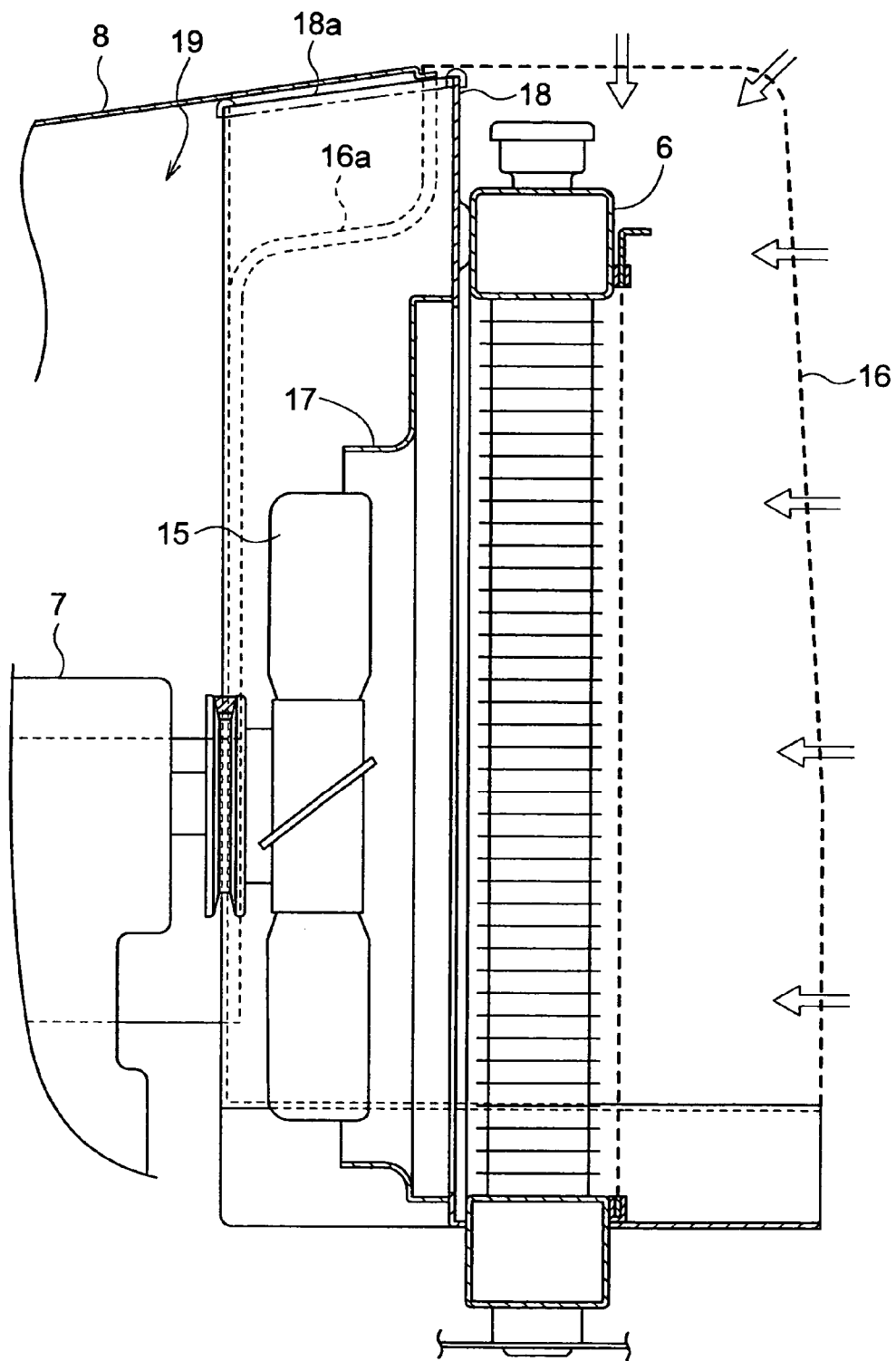
FIG. 3 a side view of an ambient air intake structure for cooling.
Figure 4:
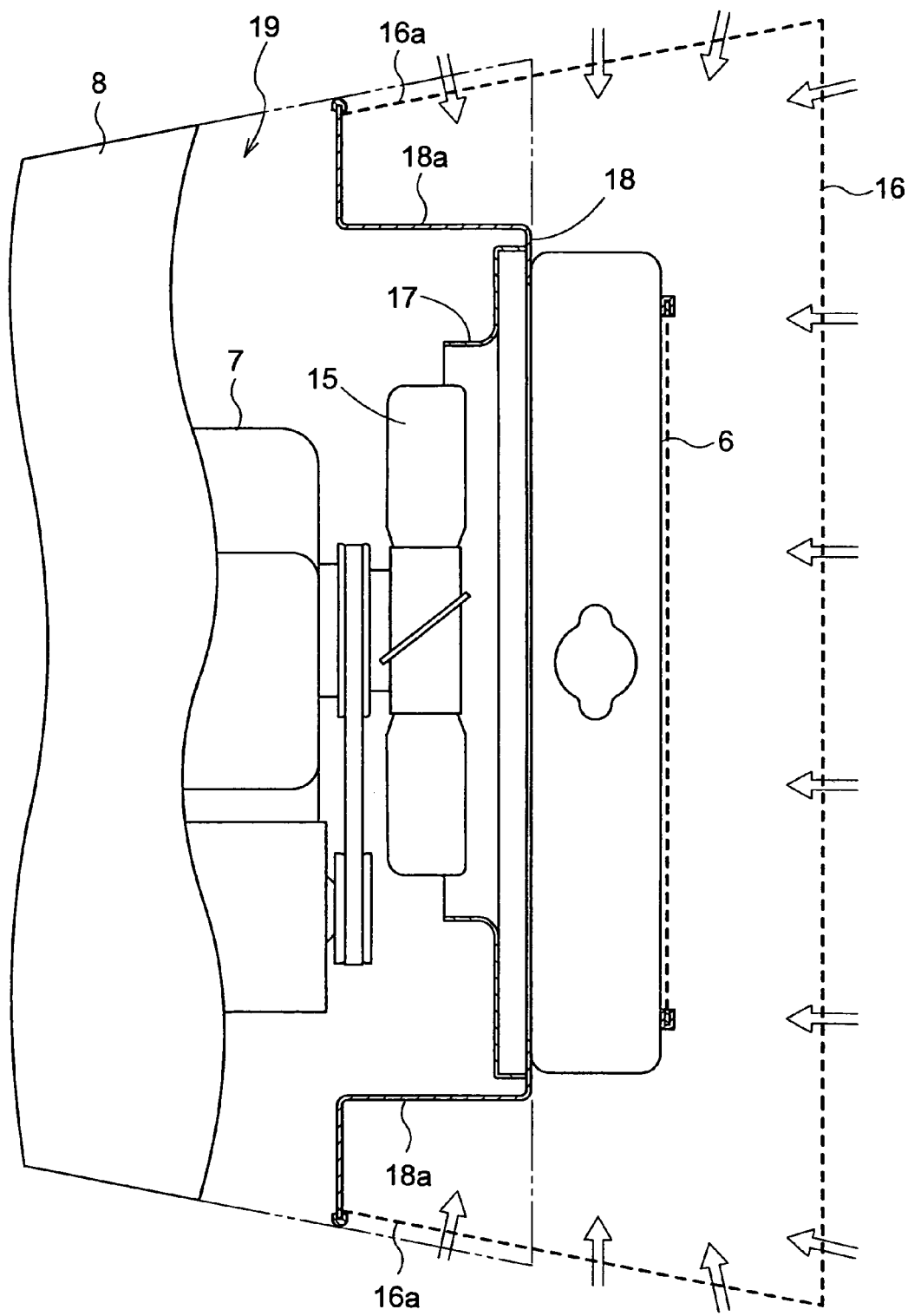
FIG. 4 is a plan view of the ambient air intake structure for cooling.
Figure 5:
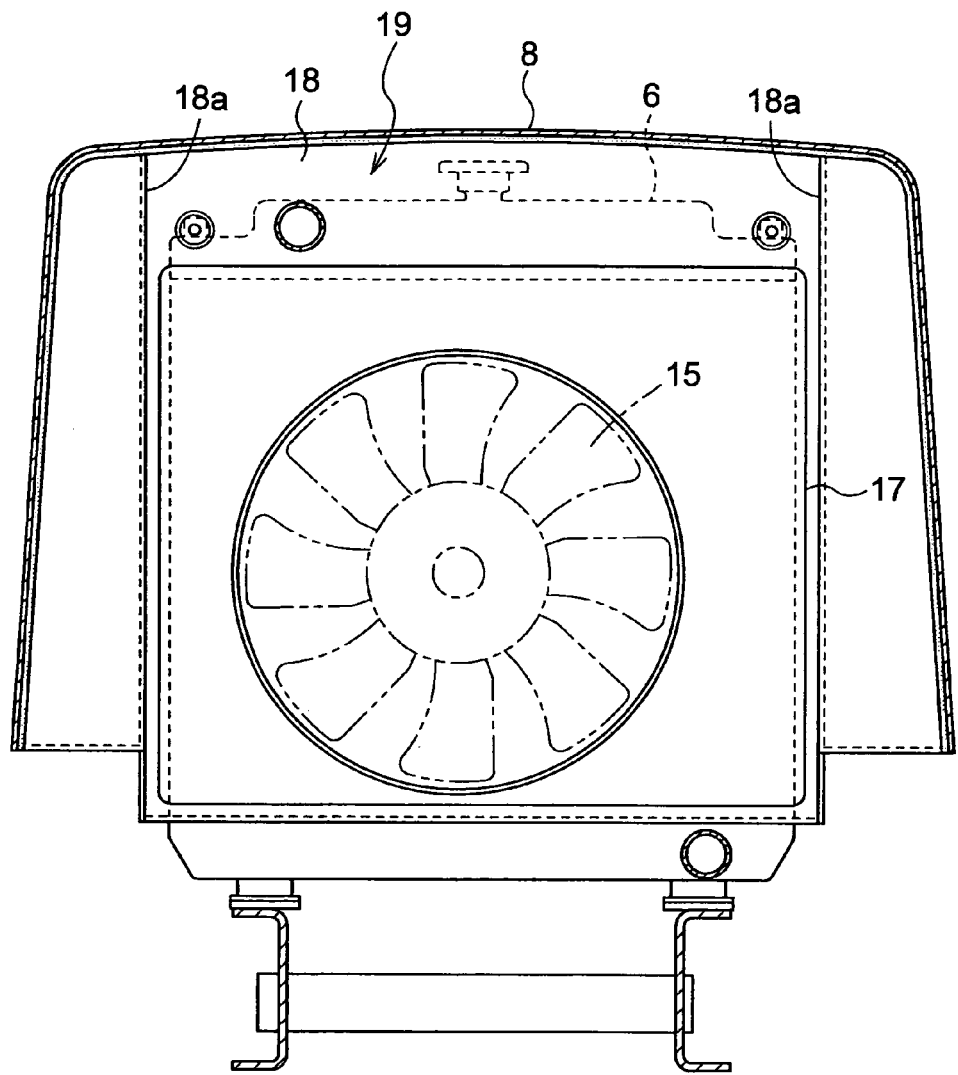
FIG. 5 a rear view of the ambient air intake structure for cooling.

A first example of the engine cooling structure is shown in FIGS. 3 through 5. As seen, a cooling fan 15 is disposed between the radiator 6 and engine 7, and is driven by the engine 7 through a belt. Ambient air is drawn from space behind the driver's seat 9 through the radiator 6. The air then flows rearwardly in the engine room to be discharged from an exhaust port 22 formed in the rear end of the engine hood 8. A box-shaped dust filtering case (dust netting) 16 is arranged forwardly of the radiator 6. Ambient air cleaned by passing through the dust netting 16 is drawn to the radiator 6 as cooling air. In the present embodiment and in some of the other embodiments, the entire dust filtering case 16 is formed of dust netting. In those embodiments, the expressions a "dust filtering case" and a "dust netting" will be used interchangeably. However, as will be described with respect to the embodiment shown in FIG. 20, the dust filtering case can have a part or parts that is not a netting.

As shown in FIGS. 3 and 4, a fan shroud 17 is attached to the back of the radiator 6 for surrounding the cooling fan 15. A partition plate 18 is attached to the fan shroud 17 for dividing the hood interior into a forward portion and a rearward portion, and preventing the heat of the engine room 19 from diffusing forwardly of the radiator 6. The partition plate 18 has a front surface adjoining the rear surface of the radiator 6. As shown in FIG. 4, for example, the partition plate 18 has right and left lateral portions 18*a* bent from the front surface to extend rearwardly from the radiator 6.

The dust netting 16 has right and left lateral portions extending rearwardly to correspond to the shape of the partition plate 18. Rearward extensions 16*a* of the dust netting 16 are connected to the lateral portions 18*a* of the partition plate 18. Thus, the dust netting 16, when seen in plan, has a bracket-shaped overall configuration opening rearwardly, thereby securing an increased air intake area. As shown in FIG. 1, upper edges of the rearward extensions 16*a* of the dust netting 16 are located substantially lower than the level of the upper surface of the engine hood 8. The dust netting 16 has a transverse width which, in plan view, progressively enlarges toward the front to correspond to the front end of the engine hood 8. The dust netting 16 has an upper surface which, in side view, is level with the highest level of the engine hood 8, and extends horizontally. The overall width of the bracket-shaped dust netting 16 corresponds to the width at the front of the engine hood 8. The rearward extensions 16*a* of the dust netting 16 are in contact with recesses 8*a* formed in the fronts of right and left side surfaces of the engine hood 8. Ambient air is directly drawn through lateral surfaces of the rearward extensions 16*a*.

It is desirable that, as described above, at least the right and left lateral portions of the dust netting 16 extend from positions forward of the front surface of the radiator 6, rearwardly beyond the front surface. It is more desirable that the right and left lateral portions of the dust netting 16 extend rearwardly beyond the rear surface of the radiator 6. More desirably, at least the right and left lateral portions of the dust netting 16 extend rearwardly beyond the front surface of the cooling fan 15. Still more desirably, the right and left lateral portions of the dust netting 16 extend rearwardly beyond the rear surface of the cooling fan 15.

The dust netting 16 constructed as described above may be displaced upward for allowing the radiator 6 to be replenished with water, and for enabling cleaning of the dust netting 16.

Second Embodiment

Figure 6:
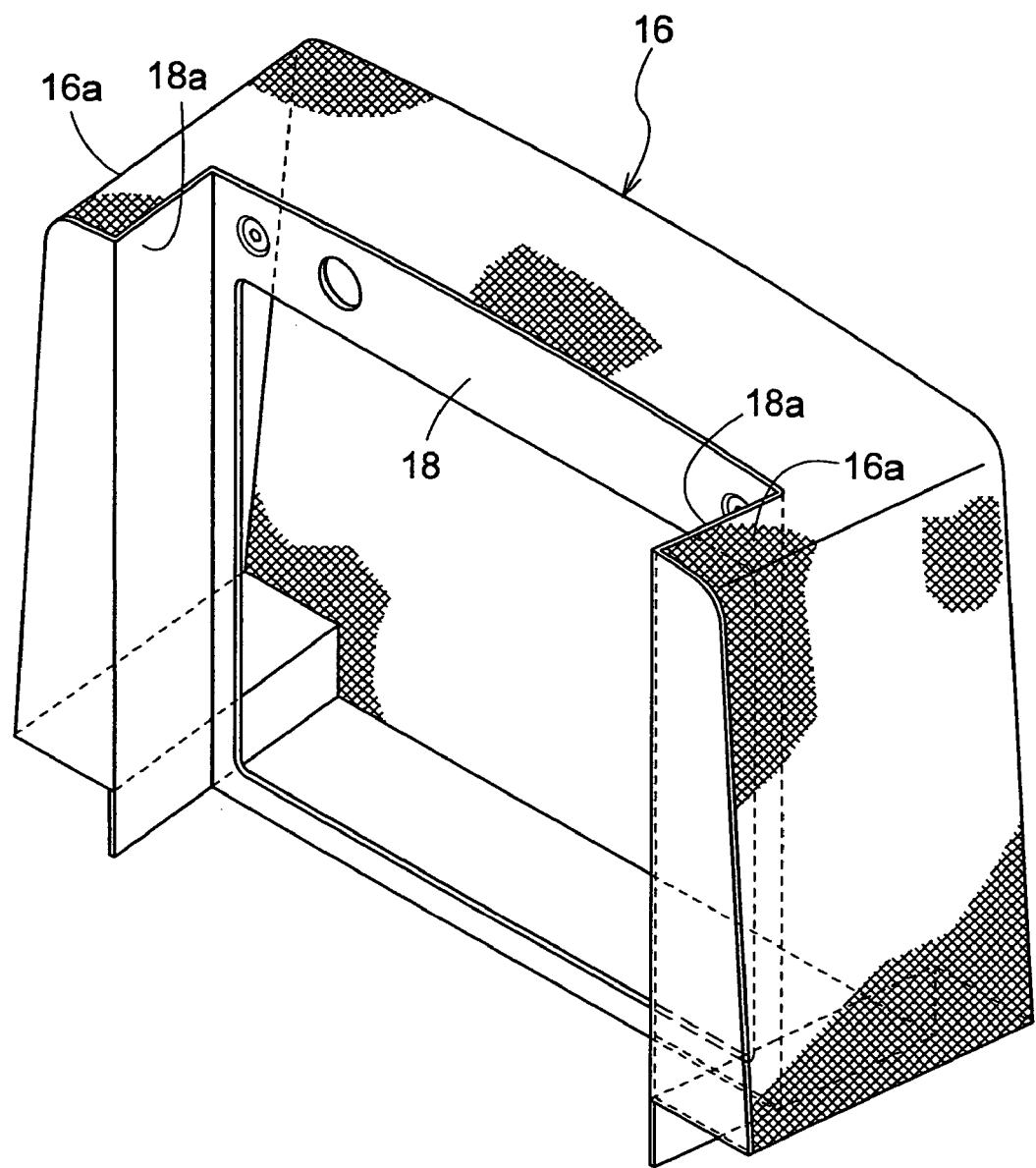
FIG. 6 is a perspective view of a dust netting in a second embodiment.

As shown in FIG. 6, the rearward extensions 16*a* of the dust netting 16 may be formed to reach the upper surface of the dust netting 16.

Third Embodiment

Figure 7:
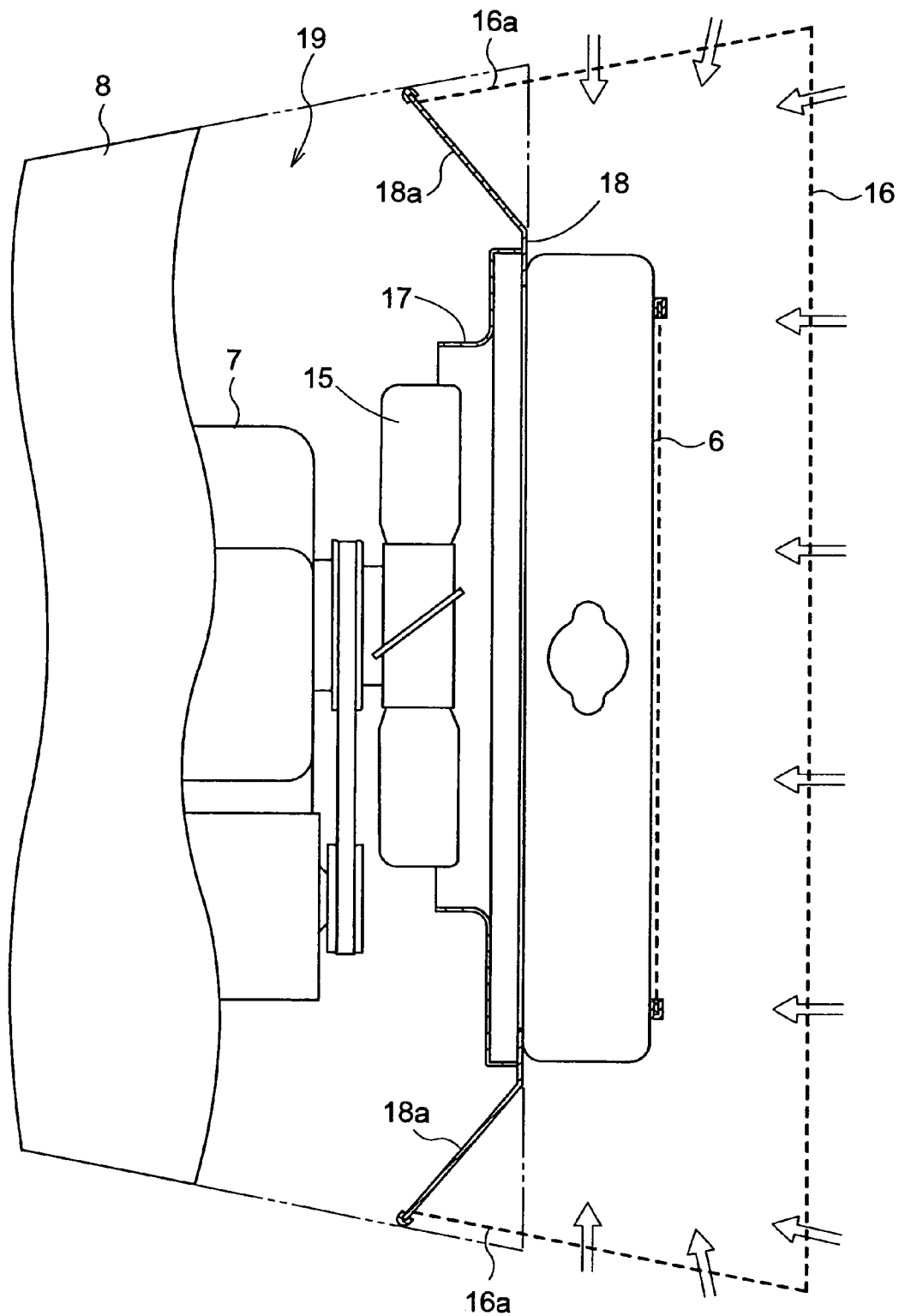
FIG. 7 is a plan view showing a modification ambient air intake structure for cooling in a third embodiment.

In order to increase the air intake area of the dust netting 16, it is desirable to enlarge the rearward extensions 16*a* as much as possible. The air intake area may be increased with sufficient effect by a construction in which, as shown in FIG. 7, the lateral portions 18*a* of the partition plate 18 are extended obliquely rearward of the radiator 6, and the dust netting 16 is connected to the lateral portions 18*a*.

Fourth Embodiment

Figure 8:
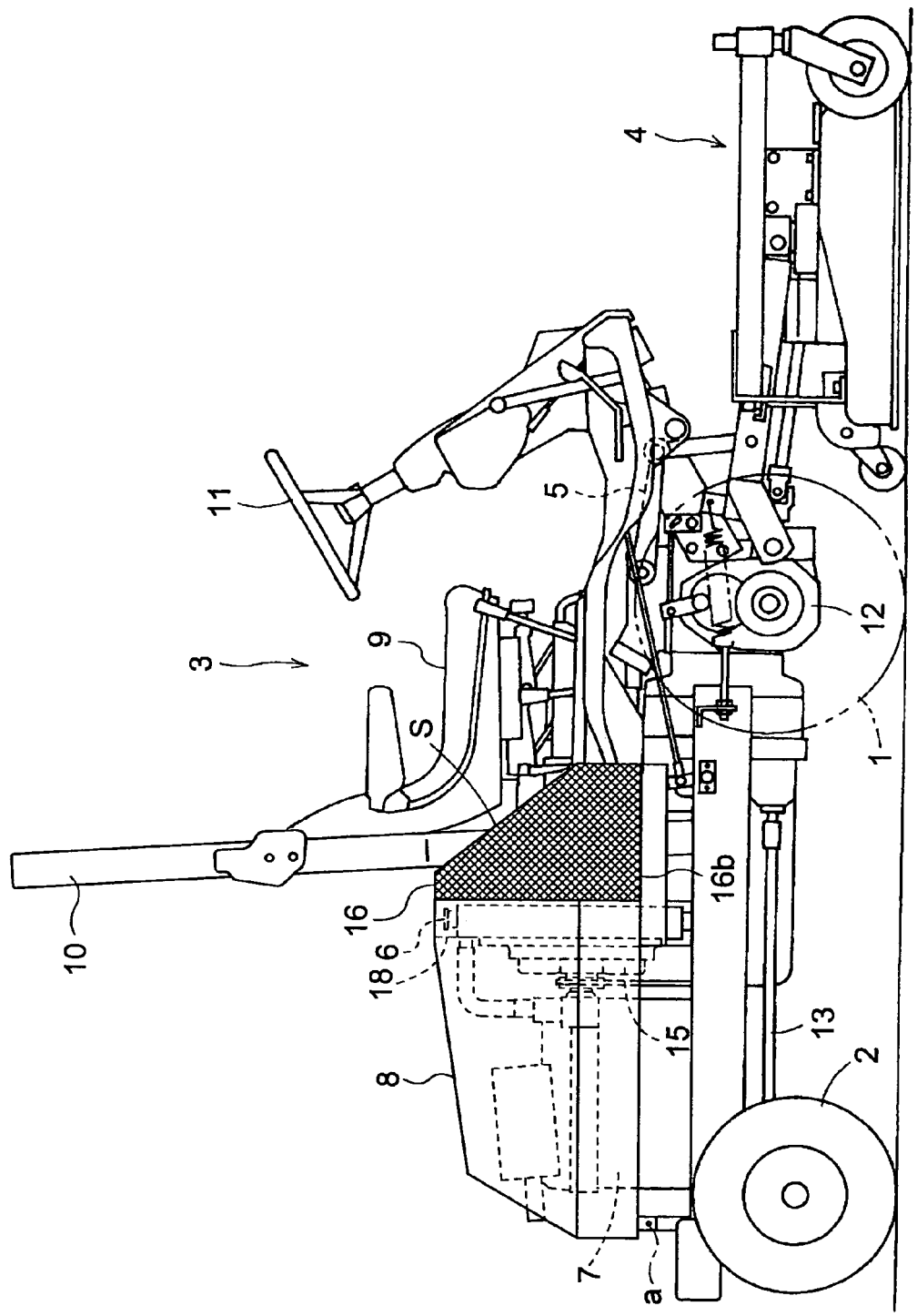
FIG. 8 is a side elevation of a lawn mower having an ambient air intake structure for cooling in a fourth embodiment.
Figure 9:
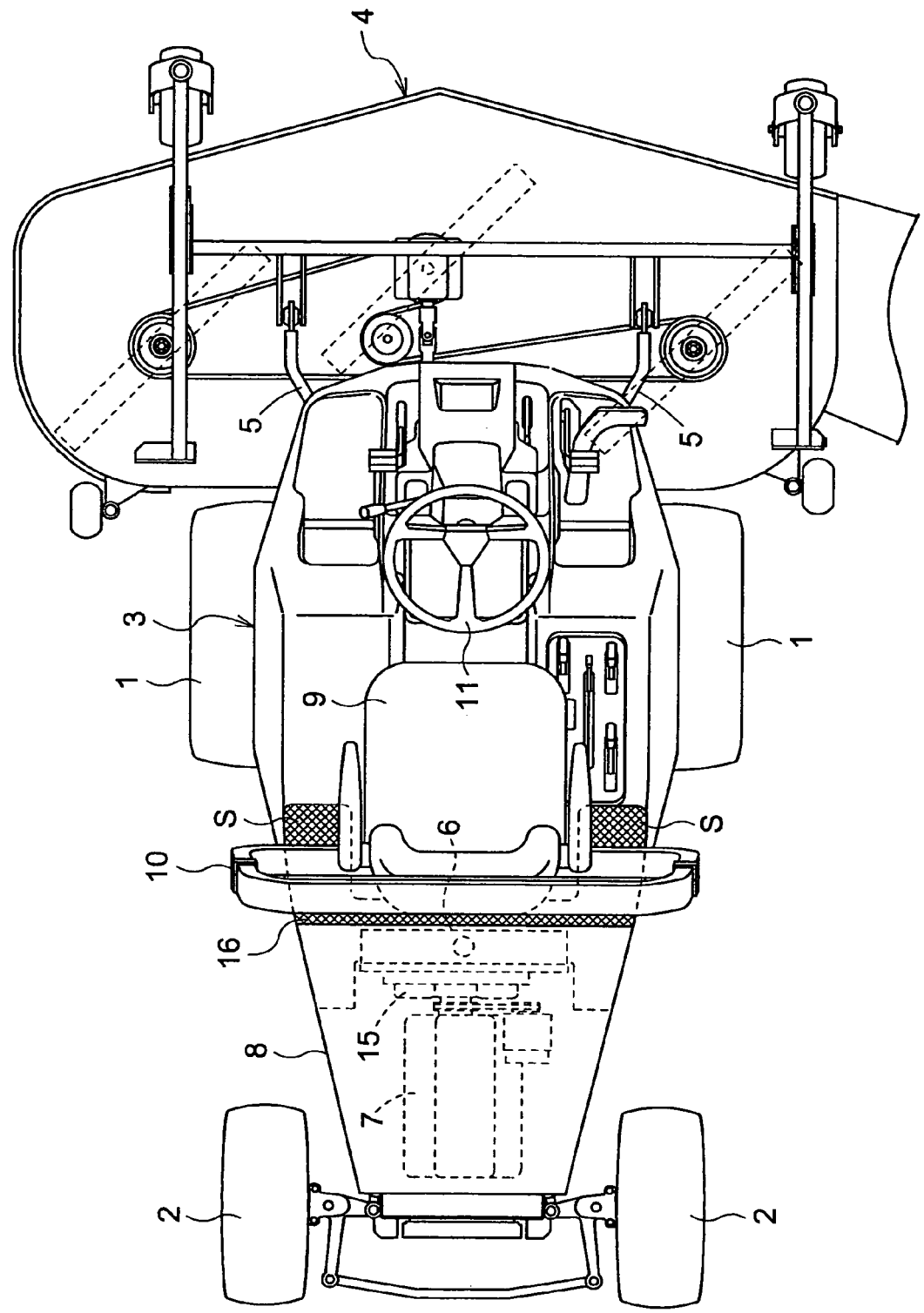
FIG. 9 is a plan view of the lawn mower having the ambient air introduction structure for cooling in the fourth embodiment.

A second example of engine cooling structure is shown in FIGS. 8 and 9. In this example, the dust netting 16 has an overall width set to correspond to the width at the forward end of the engine hood 8, and right and left lateral portions extending to outer lateral positions of the driver's seat 9, thereby realizing an increased air intake area of the dust netting 16. Forward extensions 16*b* of the dust netting 16 have upper surfaces S thereof inclined forward and downward. Thus, the forward extensions 16*b* present no obstruction to the driver moving to and from the driver's seat 9, or to movement of the elbows of the seated driver.

The width of the dust netting 16 may gradually increase from the width at the forward end of the engine hood 8, as the netting extends forward as far as a particular position, and does not change from the particular position forward.

Fifth Embodiment

Figure 10:
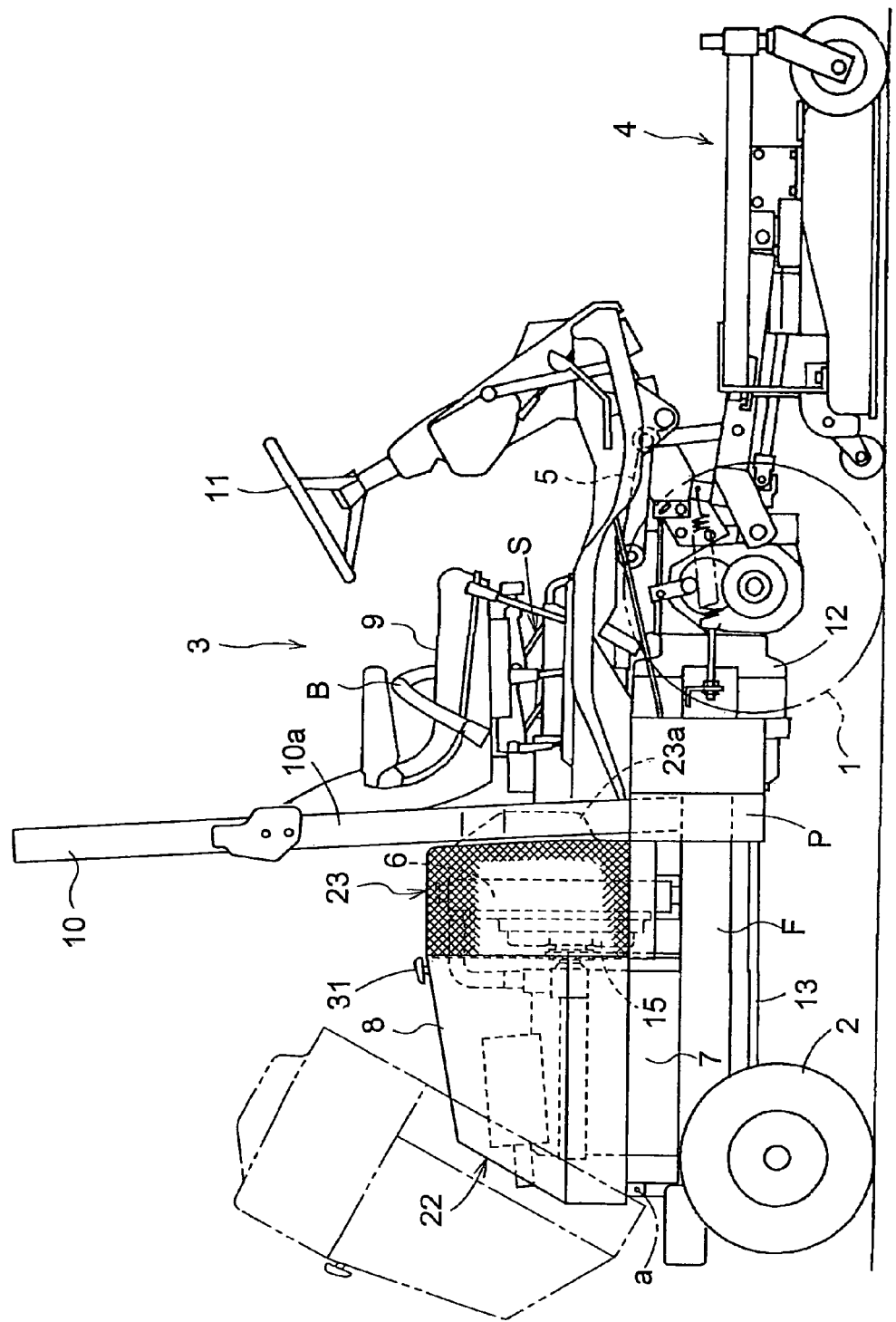
FIG. 10 is a side elevation of a lawn mower in a fifth embodiment.
Figure 11:
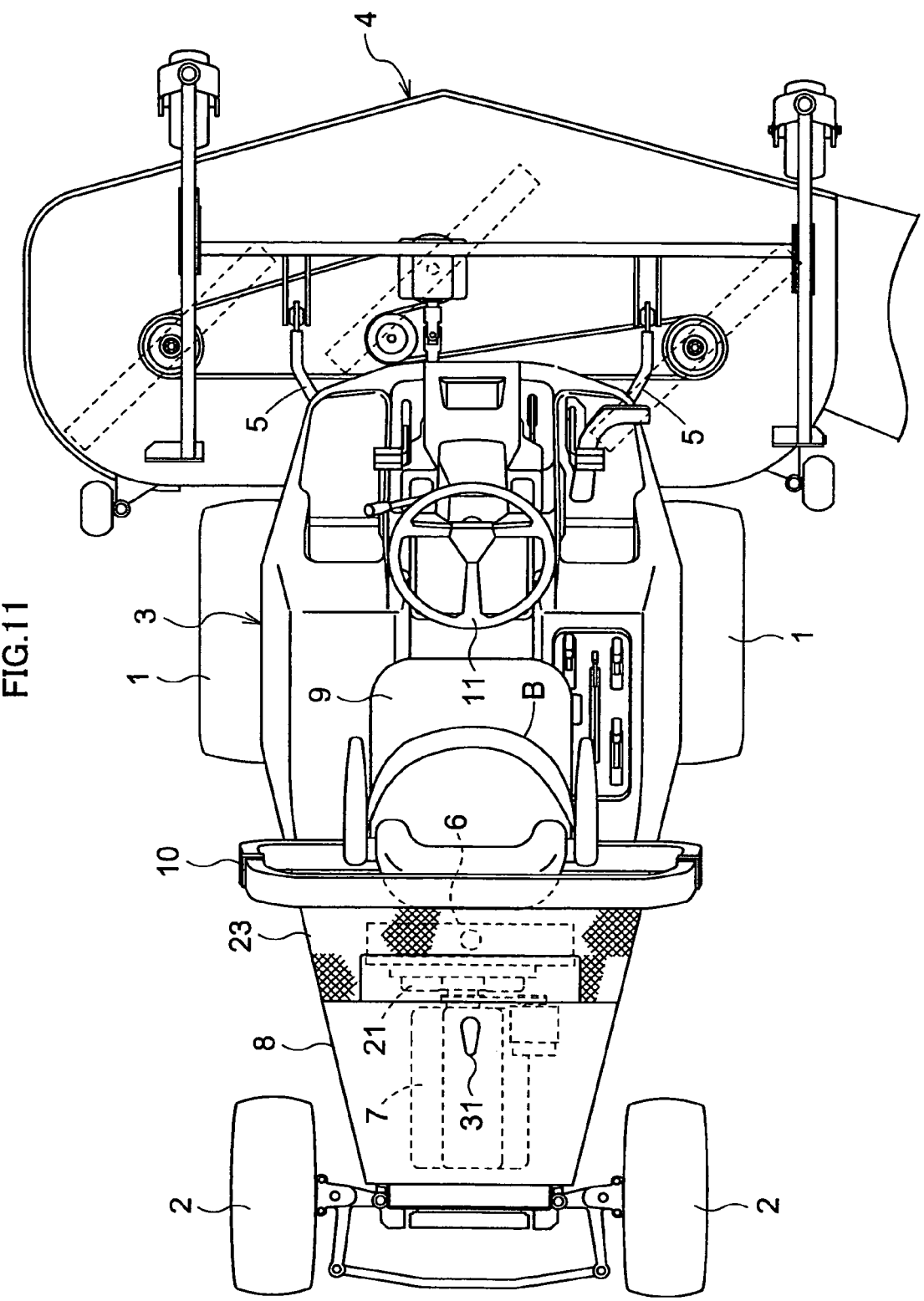
FIG. 11 is a plan view of the lawn mower in the fifth embodiment.

FIG. 10 shows a side elevation of a lawn mower of in a fifth embodiment. FIG. 11 is a plan view of the lawn mower.

Output of an engine 7 is inputted to a hydrostatic stepless transmission (HST) located in a forward portion of a vehicle body to undergo a stepless change speed, and then is reduced in a transmission case 12 directly connected to the front of the HST. Propelling drive branched off in the transmission case 12 is transmitted to rear wheels 2 through a transmission shaft 13.

Figure 17:
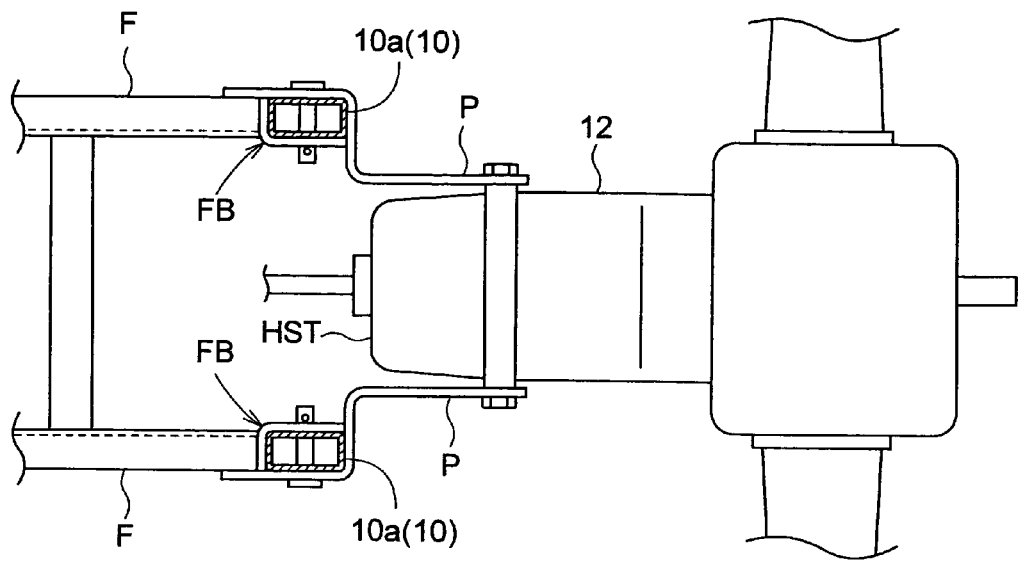
FIG. 17 is a plan view showing a base structure of a rollover protection frame in the fifth embodiment.
Figure 18:
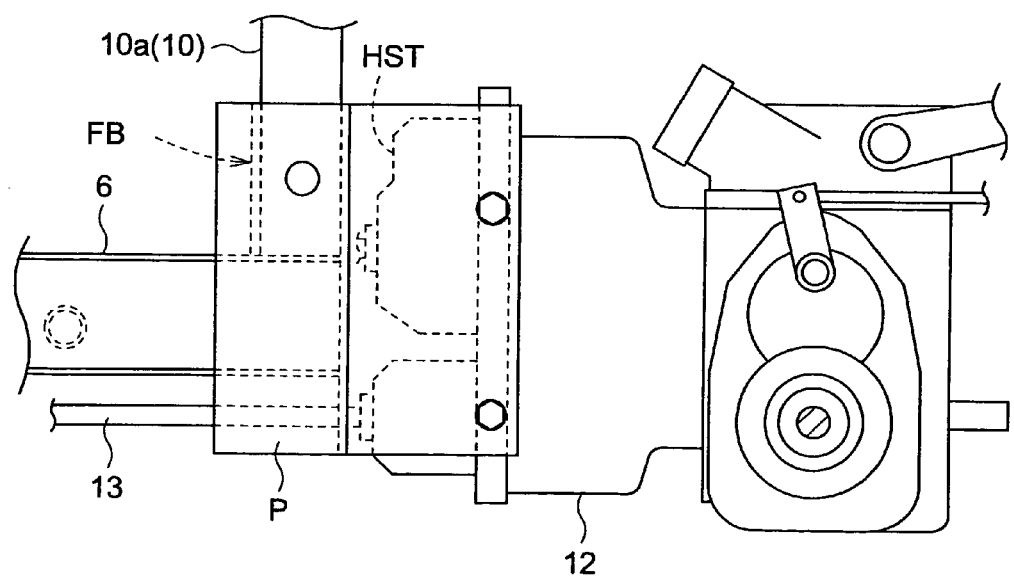
FIG. 18 is a side view showing the base structure of the rollover protection frame in the fifth embodiment.

As shown in FIG. 17, the transmission case 12 is connected to forward ends of right and left main frames F through a pair of right and left connecting plates P bent to a stepped shape in plan view. Bosses FB in the form of bottomed square pipes are provided by using the main frames F and corners of the stepped connecting plates P. Lower ends of right and left posts 10*a* of a rollover protection frame 10 are inserted in and pin-connected to these bosses FB.

The driver's seat 9 is mounted on a suspension mechanism S to be positionally adjustable backward and forward. This driver's seat 9 is equipped with a seat belt B. With the driver's seat 9 itself having the seat belt B, even when the driver's seat 9 moves unsteadily upward with bouncing of the vehicle body while running, the seat belt B will move with the driver's seat 9 to avoid strong tightening.

A cooling air intake structure in this embodiment will be described in detail hereinafter.

A filter 24 of fine mesh is disposed in front of a radiator 6 to be removable upward. An oil cooler 25 is disposed in a cooling air passage to the radiator 6 for cooling pressure oil of a hydraulic system.

The engine hood 8 is formed shorter longitudinally of the vehicle body than an ordinary hood. The engine hood 8 has a front end thereof located rearwardly of the radiator 6. The box-shaped dust netting 23 is connected to the front end of the engine hood 8. The dust netting 23 is formed of steel sheet punched out with numerous pores and formed into a box shape. The dust netting 23 is swingable to open and close with the engine hood 8. The dust netting 23 has a bulge portion 23a formed adjacent the center of the front and protruding into a space between the right and left posts 10a of the rollover protection frame 10.

Figure 12:
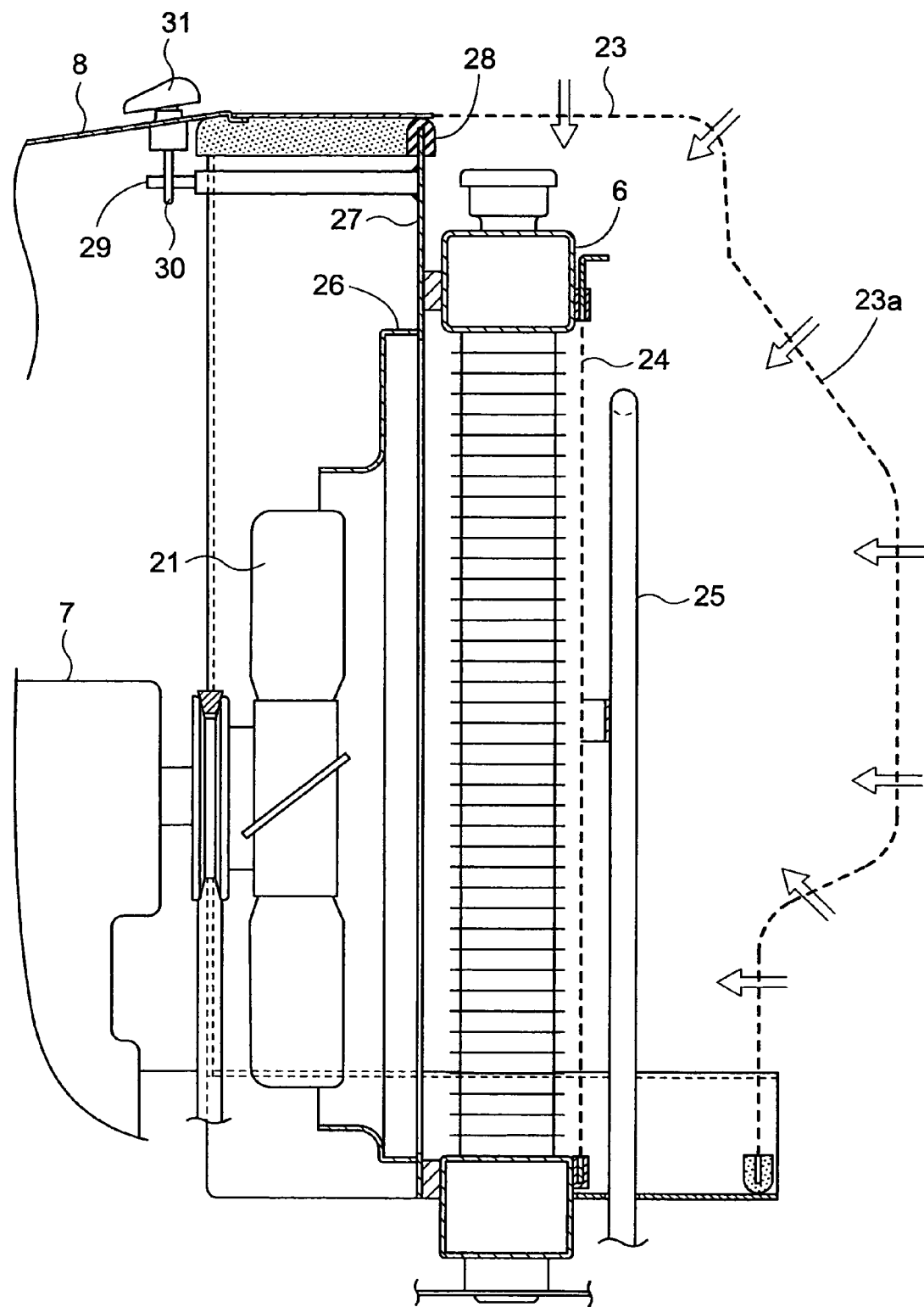
FIG. 12 is a side view in vertical section of an ambient air intake structure for cooling in the fifth embodiment.
Figure 13:
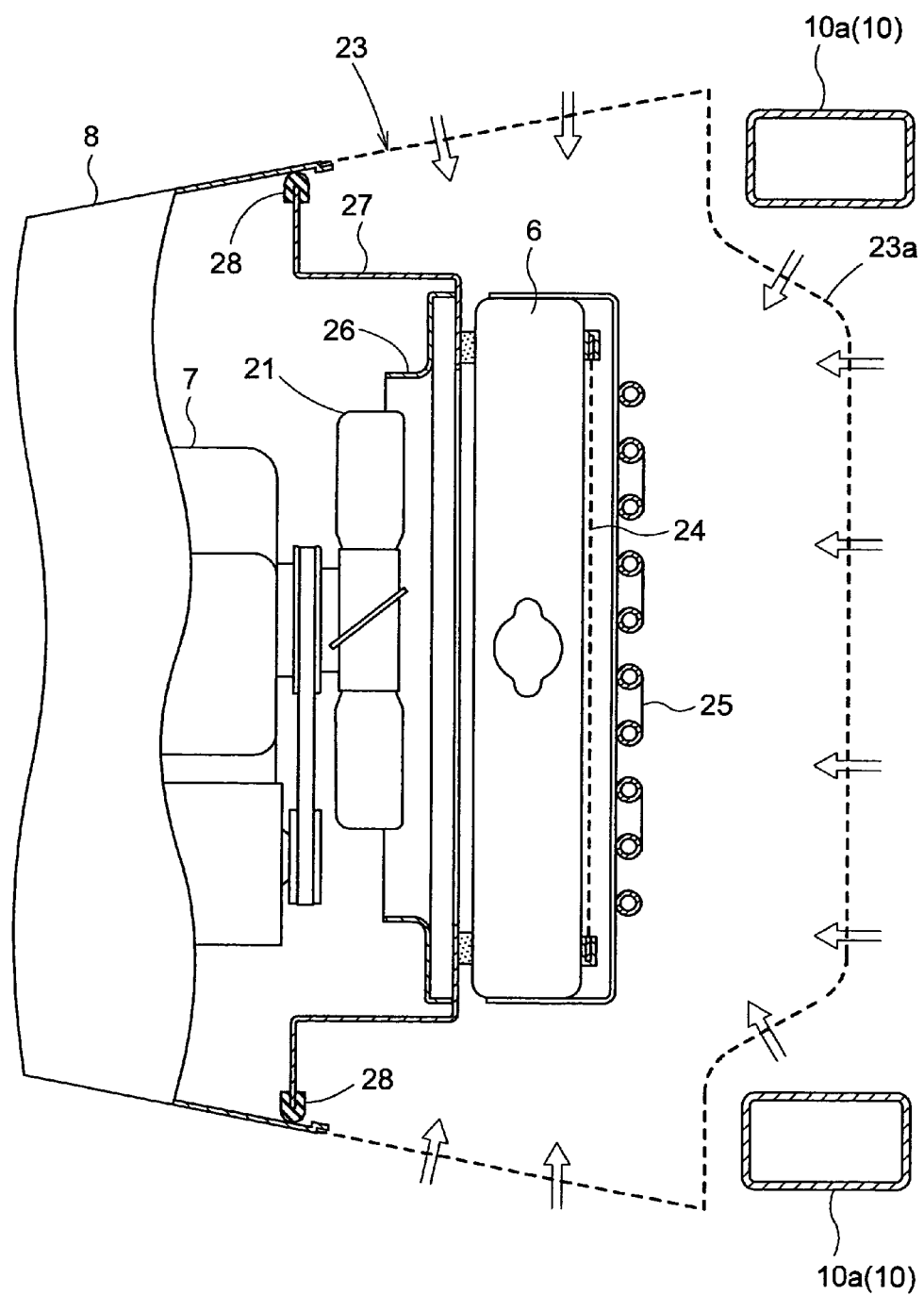
FIG. 13 is a sectional plan view of the ambient air intake structure for cooling in the fifth embodiment.
Figure 14:
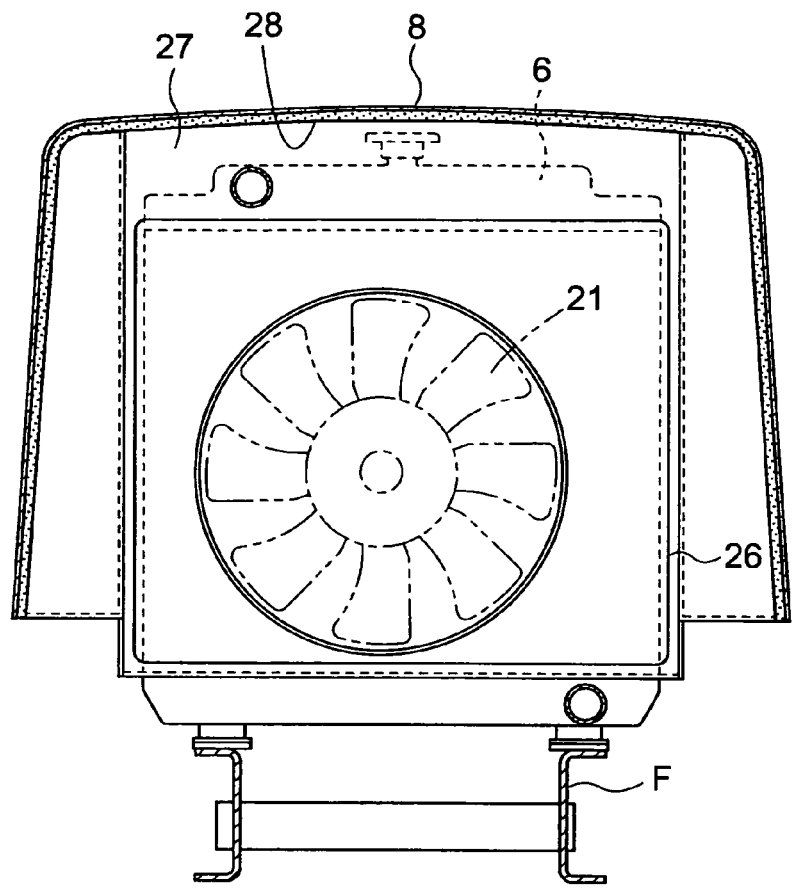
FIG. 14 is a front view in vertical section of the ambient air intake structure for cooling in the fifth embodiment.
Figure 15:
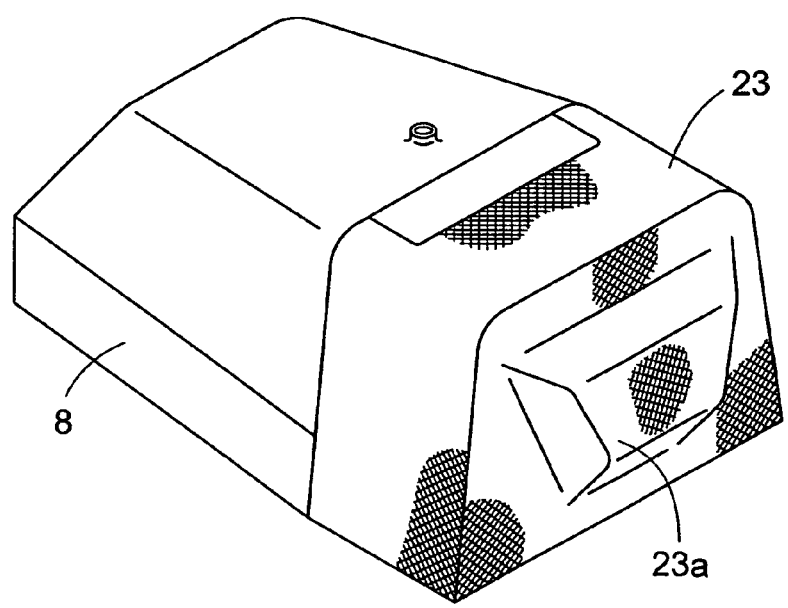
FIG. 15 is a perspective view of an engine hood with a dust netting in the fifth embodiment.
Figure 16:
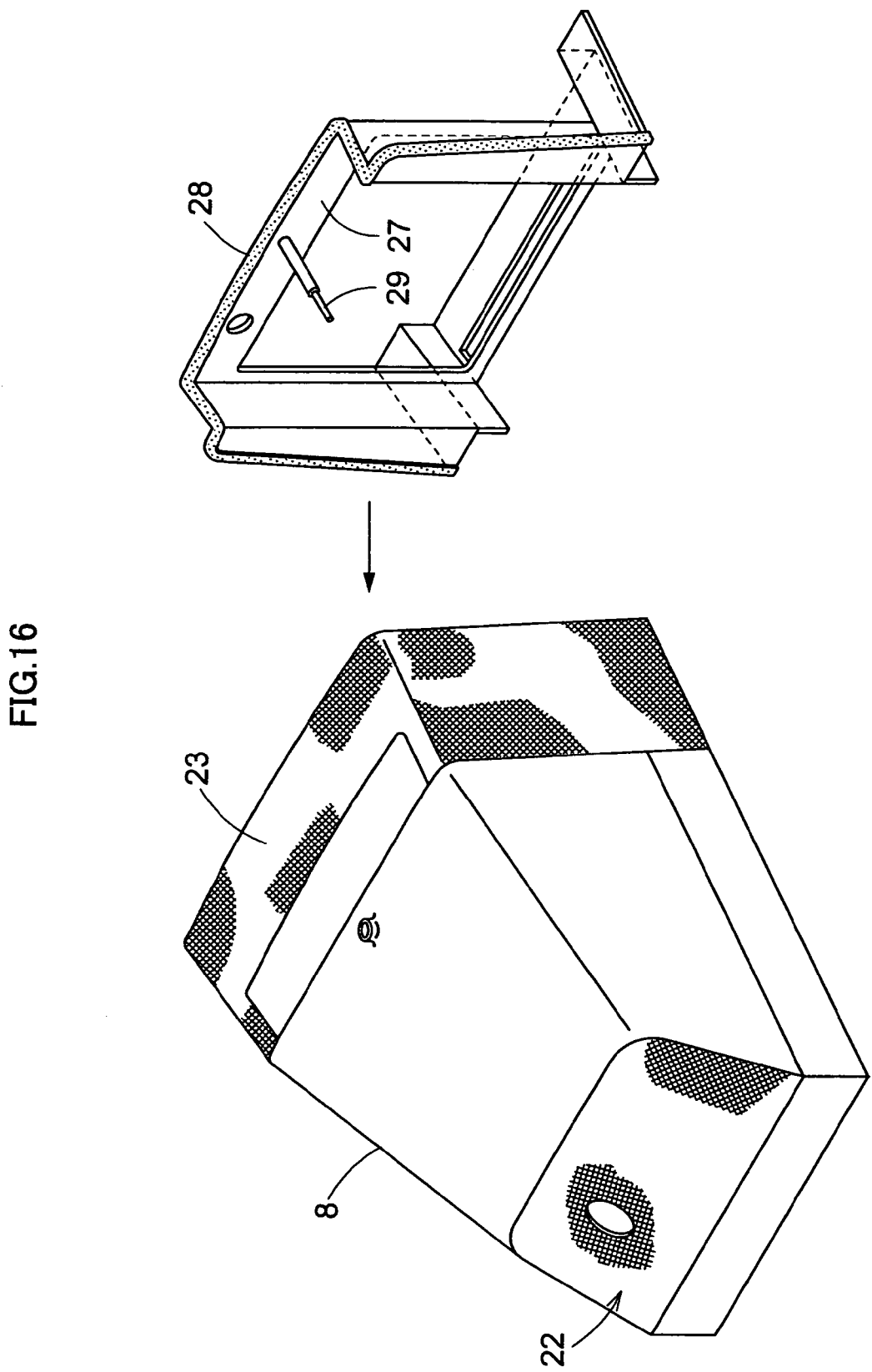
FIG. 16 is an exploded perspective view of a partition plate and the engine hood with the dust netting in the fifth embodiment.

As shown in FIG. 12, when the engine hood 8 is closed to a predetermined posture, opposite lateral portions at the forward end of the engine hood 8 and upper positions of the dust netting 23 are in pressure contact with rubber seals 28 mounted peripherally of a partition plate 27. Thus, the front end of the engine room is divided and closed in airtight state.

According to the cooling air intake structure having the above construction, the dust netting 23 has upper and right and left lateral portions thereof acting as air intake surfaces and extending rearwardly beyond the rear surface of the radiator 6. Thus, the dust netting 23 has an increased air intake area. The bulge portion 23a formed on the front surface of the dust netting 23 contributes to a further increase in the air intake area.

The engine hood 8 has a lock piece 30 attached to a middle position at the front end thereof engageable sideways by a biased securing pin 29 provided in an upper position of the partition plate 27. A knob 31 is mounted on the upper surface of the engine hood 8 to be rotatable for unlocking the lock piece 30. Thus, the hood 8 may only be swung down to be locked to the closed position automatically. The engine hood 8 may be swung up to open after turning the knob 31 to undo the lock.

Sixth Embodiment

Figure 19:
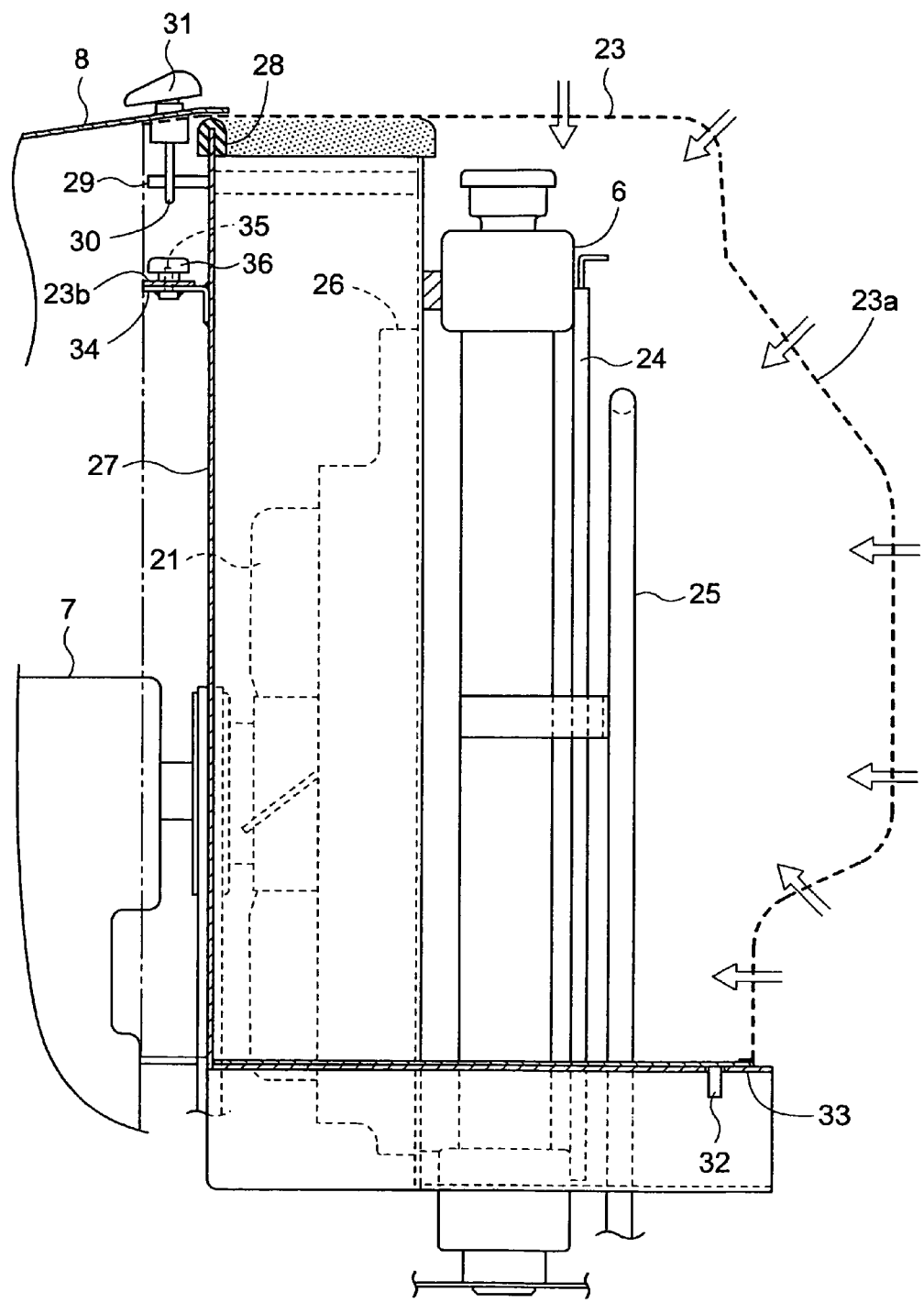
FIG. 19 is a side view in vertical section showing an ambient air intake structure for cooling in a sixth embodiment.

As shown in FIG. 19, the dust netting 23 may be constructed independently attachable to and detachable from the engine hood 8. In this case, when the engine hood 8 is opened, downward pins 32 arranged on right and left lower edges of the dust netting 23 are inserted in receiving frames 33 of the vehicle body, and links 23b arranged in right and left positions at the rear end of the dust netting 23 are fitted on securing bolts 35 of mounting seats 34 formed on the partition plate 27. Then, knobbed nuts 36 are attached and fastened to the securing bolts 35, thereby positioning and fixing the dust netting 23. Subsequently, the engine hood 8 may be closed to lie on the rear end of the dust netting 16.

As shown in FIG. 19, an upper portion of the partition plate 27 is opposed to the inner surface at the front end of the engine hood 8, thereby further increasing the air intake area in the upper portion of the dust netting 23.

Figure 20:
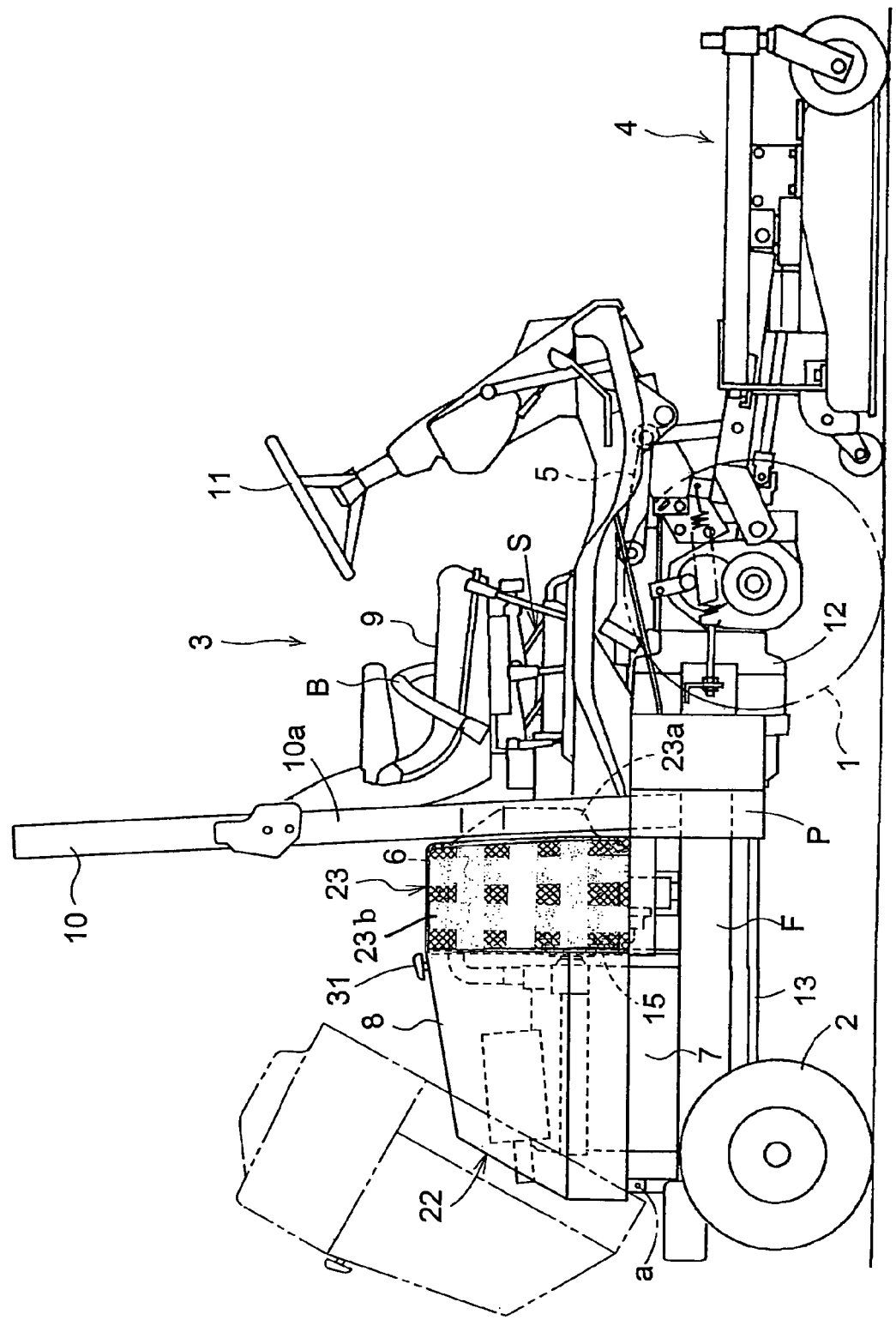
FIG. 20 is a side elevation view of a lawn mower in a seventh embodiment.

FIG. 20 shows an example of an embodiment where not all parts of the dust filtering case 23 is formed with netting. The non-netting portions 23, formed with, for example, the same material as the hood 8, in FIG. 20 are exaggerated in size for clarity. The non-netting portions may have curved edges or may be of other shapes.

What is claimed is:

1. A lawn mower comprising:
   a plurality of wheels;
   a vehicle body supported by the wheels;
   a mower unit supported by said vehicle body;
   a driver's seat supported by said vehicle body;
   an engine supported by said vehicle body rearwardly of said driver's seat;
   a radiator disposed between said engine and said driver's seat;
   a hood for covering said engine; and
   a dust filtering case disposed at a forward portion of said hood for allowing ambient cooling air to be drawn into said radiator, the dust filtering case surrounding at least a part of the radiator and having a net portion on at least one side thereof, the net portion extending rearwardly beyond a front surface of said radiator;
   wherein the net portion has a front face net portion, upper net portion and a pair of lateral net portions that extend continuously from the front face net portion;
   wherein the upper net portion is continuous with a corresponding portion of the engine hood; and
   wherein the pair of lateral net portions are continuous with corresponding portions of the engine hood.

2. A lawn mower as defined in claim 1, wherein the net portion of the dust filtering case extend rearwardly beyond a rear surface of said radiator.

3. A lawn mower as defined in claim 2, further comprising a cooling fan disposed between said engine and said radiator, the net portion of the dust filtering case extending rearwardly beyond a front surface of said cooling fan.

4. A lawn mower as defined in claim 3, wherein the net portion of the dust filtering case extends rearwardly beyond a rear surface of said cooling fan.

5. A lawn mower as defined in claim 1, wherein said engine hood has a lower edge extending rearwardly at a position substantially lower than an upper surface of the hood, and a vertical edge extending downwardly from said lower edge, the net portion of the dust filtering case that extends rearwardly being located adjacent said lower edge and said vertical edge.

6. A lawn mower as defined in claim 1, further comprising a partition plate for separating an engine room and a front of said radiator, said partition plate having a side portion extending rearwardly, said dust filtering case being connected to said side portion.

7. A lawn mower as defined in claim 1, further comprising a rollover protection frame disposed forwardly of said radiator, and having a pair of legs, at least a part of said net portion protruding into a space between said pair of legs.

8. A lawn mower as defined in claim 1, wherein at least a lateral side of the net portion of the dust filtering case extends forwardly beyond a rear surface of said driver's seat.

9. A lawn mower as defined in claim 8, wherein said at least lateral side of the net portion extending forwardly has an inclined upper surface.

10. A lawn mower as defined in claim 1, wherein the net portion having an upper net portion and lateral net portions extending respectively in an upper portion and lateral portions of said dust filtering case and wherein the upper net portion and the lateral net portions extend rearwardly beyond a rear surface of said radiator.

11. A lawn mower as defined in claim 10, wherein said dust filtering case is connected to said engine hood such that the dust filtering case can be opened and closed with said engine hood.

12. A lawn mower as defined in claim 1, wherein said engine is water-cooled.

13. A lawn mower as defined in claim 1, further having a lock member located in the hood near the dust filtering case for locking the hood in place.

14. A lawn mower as defined in claim 1, wherein said dust filtering case is connected to said engine hood such that the dust filtering case can be opened and closed with said engine hood.

15. A lawn mower as defined in claim 1, wherein
- at least a front portion of the engine hood is shaped such that a lateral width of the at least a front portion increases in a forward direction; and
- the dust filtering case is shaped such that a lateral width of the dust filtering case increases in a forward direction in correspondence with the shape of the at least a front portion of the engine hood.

* * * * *